United States Patent
Obergasser

(10) Patent No.: US 8,272,490 B2
(45) Date of Patent: Sep. 25, 2012

(54) ARRANGEMENT OF A DISK SPRING AT A PISTON OF A SWITCHING ELEMENT

(75) Inventor: Michael Obergasser, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 436 days.

(21) Appl. No.: 12/596,219

(22) PCT Filed: Apr. 3, 2008

(86) PCT No.: PCT/EP2008/053977
§ 371 (c)(1),
(2), (4) Date: Oct. 19, 2009

(87) PCT Pub. No.: WO2008/128866
PCT Pub. Date: Oct. 30, 2008

(65) Prior Publication Data
US 2010/0065399 A1   Mar. 18, 2010

(30) Foreign Application Priority Data
Apr. 21, 2007   (DE) .......................... 10 2007 018 969

(51) Int. Cl.
*F16D 25/0638* (2006.01)
(52) U.S. Cl. ................. 192/85.39; 192/130 B
(58) Field of Classification Search .... 192/85.19–85.45; 92/84, 85 A, 130 C, 130 B
See application file for complete search history.

(56) References Cited

U.S. PATENT DOCUMENTS

| | | | | |
|---|---|---|---|---|
| 3,753,478 A | * | 8/1973 | Shiber | ......................... 192/85.34 |
| 3,832,934 A | | 9/1974 | Dach et al. | |
| 4,945,782 A | | 8/1990 | Farrell | |
| 6,786,843 B2 | | 9/2004 | Mizuno | |
| 6,851,526 B2 | | 2/2005 | Ore | |
| 7,111,833 B2 | | 9/2006 | Wittkopp | |
| 2001/0011626 A1 | * | 8/2001 | Meyer et al. | ............. 192/85 CA |
| 2006/0260901 A1 | * | 11/2006 | Sawayanagi | ................ 192/85 A |

FOREIGN PATENT DOCUMENTS

| | | |
|---|---|---|
| DE | 1 630 950 | 7/1971 |
| DE | 2 124 008 | 12/1972 |
| DE | 26 05 228 A1 | 8/1977 |
| DE | 101 24 213 A1 | 6/2002 |
| DE | 10 2005 045 322 A1 | 4/2006 |
| EP | 1 298 355 A1 | 4/2003 |
| EP | 1 422 434 A1 | 5/2004 |
| FR | 2 386 731 A1 | 11/1978 |

* cited by examiner

*Primary Examiner* — David D Le
*Assistant Examiner* — Lillian Nguyen
(74) *Attorney, Agent, or Firm* — Davis & Bujold, P.L.L.C.

(57) ABSTRACT

An arrangement of a disk spring (2) at a piston (1) of a shifting element (3) in which the fingers of the disk spring (2) protrude through crests in the housing (4) and abut against a sheet metal sleeve (5) which is held in the housing (4) of the shifting element (3). The disk spring (2) is configured as a closed ring and the outer diameter (7) of the disk spring (2) abuts against the piston (1) of the shifting element (3).

6 Claims, 2 Drawing Sheets

ARRANGEMENT OF A DISK SPRING AT A PISTON OF A SWITCHING ELEMENT

This application is a National Stage completion of PCT/EP2008/053977 filed Apr. 3, 2008, which claims priority from German patent application Ser. no. 10 2007 018 969.0 filed Apr. 21, 2007.

FIELD OF THE INVENTION

The present invention relates to an arrangement of a disk spring at a piston of a shifting element.

BACKGROUND OF THE INVENTION

A mount for one or several springs acting on an axially displaceable component is known from DE-OS 2124008, in particular for repositioning springs acting on an annular piston of a friction clutch or brake that can be acted upon by a pressure means. In this case, a single or multi-piece support member that is cross-sectionally configured double angle-shaped is provided, which is inserted with one leg into the recess of a groove in a fixed component, and on whose other leg the spring directly rests or abuts against, via connecting links.

Also known from prior art is directly arranging the disk springs with their internal fingers on the piston of a switching element. In this case, the disadvantage is that the arrangement of the fingers of the disk spring may result in high wear of the piston.

SUMMARY OF THE INVENTION

The object of the present invention, therefore, is to disclose an arrangement of a disk spring at a piston of a shifting element by means of which wear of the piston is avoided in a simple manner. Since little installation space is available because of the design, the arrangement of the disk spring according to the present invention should guarantee a space-saving arrangement of the piston, the piston pins, the disk spring and the snap ring.

Accordingly, an arrangement of a disk spring is proposed in which the fingers of the disk spring protrude through crests in the housing and abut against a sheet metal sleeve which is held in the housing of the shifting element, wherein the outer diameter of the disk spring, which is configured as a closed ring, abuts against the piston of the shifting element. As a result, compression and thus wear of the piston are reduced. By pre-stressing the disk spring, loosening of the sheet metal sleeve is further prevented.

Within the scope of an especially advantageous improvement of the invention, the sheet metal sleeve is held in the housing by means of a bayonet lock or bayonet mount.

Furthermore, in the context of an advantageous improvement it is provided that the piston pin to actuate the shifting element extends through between the fingers of the disk spring which advantageously results in an extremely compact design.

BRIEF DESCRIPTION OF THE DRAWINGS

The invention will be explained below in more detail with reference to the attached figures. Shown are.

DETAILED DESCRIPTION OF THE PREFERRED EMBODIMENTS

Figure 1:
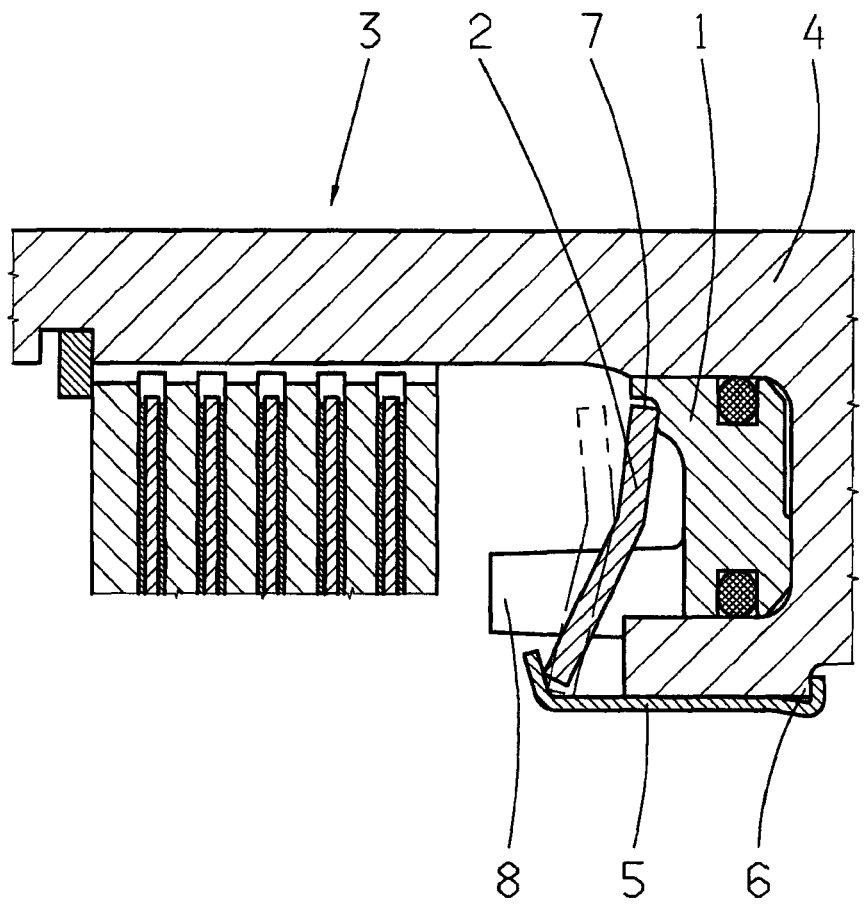
FIG. 1: A schematic sectional view to illustrate the arrangement of the disk spring according to the present invention.

Shown in the Figures are the piston of the shifting element 3 and the disk spring designated with 2. The disk spring 2 is arranged in such a way that the fingers of the disk spring 2 protrude through crests in the housing 4 and abut against a sheet metal sleeve 5 which is held in the housing 4 of the shifting element 3.

Within the scope of an especially advantageous embodiment of the invention, the sheet metal sleeve 5 is held in the housing 4 by means of a bayonet lock and/or a bayonet mount 6. For this purpose, the sheet metal sleeve 5 is preferably configured as a bayonet ring and has several protrusions which may be inserted into the grooves provided in the housing and locked by turning.

Figure 2:
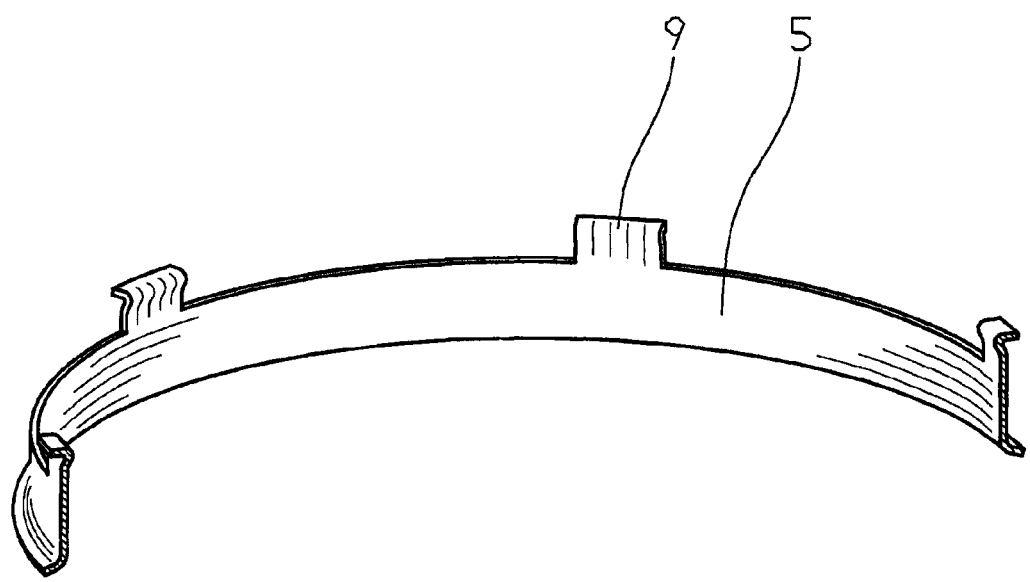
FIG. 2: A perspective view of an embodiment of the sheet metal sleeve required for the arrangement of the spring disk.

A possible embodiment of the sheet metal sleeve 5 is the subject matter of FIG. 2 which shows one part of the sleeve 5, wherein the protrusions are designated with 9.

Furthermore, the outer diameter 7 of the disk spring 2 abuts against the piston 1 of the shifting element. As already explained, the piston pins 8 extend between the fingers of the disk spring 2 to actuate the shifting element.

By means of this invention an arrangement of the disk spring of a shifting element is provided which requires little installation space and results in minor wear of the piston.

Reference Numerals
1 Piston
2 Disk spring
3 Switching element
4 Housing
5 Sheet metal sleeve
6 Bayonet lock
7 Outer diameter of the disk spring
8 Piston pin
9 Protrusion

The invention claimed is:

1. An arrangement of a disk spring at a piston of a shifting element, fingers of the disk spring (2) abut against a sheet metal sleeve (5) which comprises opposite ends, the sheet metal sleeve extends axially and the opposite ends of the sheet metal sleeve are angled radially outwardly from the sheet metal sleeve, a housing (4) of the shifting element (3) and the disk spring being located on a common radial side of the sheet metal sleeve, and an outer diameter (7) of the disk spring (2), which is configured as a closed ring, abuts against the piston (1) of the shifting element (3).

2. The arrangement of the disk spring at the piston of the shifting element according to claim 1, wherein the sheet metal sleeve (5) is mounted to the housing (4) by one of a bayonet lock and a bayonet mount (6), the housing (4) has openings and the sheet metal sleeve (5) is configured as a bayonet ring and has several protrusions (9) which are insertable into the openings provided on the housing (4) and are lockable by rotation of the sheet metal sleeve with respect to the housing.

3. The arrangement of the disk spring at the piston of the shifting element according to claim 1, wherein a piston pin (8), which actuates the shifting element (3), extends between the fingers of the disk spring (2).

4. An arrangement of a disk spring and a shifting element piston, the arrangement comprising:

a housing (4) of shifting element (3) having axially extending walls that define a cylinder in which the shifting element piston slides;

the disk spring (2) having a radially inner end that engages a first axial end of a sheet metal sleeve (5), and a radially outer perimeter that engages the shifting element piston (1) adjacent a radially outer wall of the housing;

the sheet metal sleeve (5) having the first axial end, a second axial end and a central portion that extends axially and is substantially cylindrical, the first axial end of the sheet metal sleeve has a plurality of protrusions (9) which engage with (4) and fix the sheet metal sleeve (5) in the housing (4), both of the spring disk and the housing contacting the sheet metal sleeve on a radially outer side thereof; and piston pins (8) extending from the piston (1) on one axial side of the disk spring (2) to an axially opposite side of the disk spring, for actuating the shifting element (3).

5. An arrangement of a cup spring (2) in a piston (1) of a shifting element (3) in which an outer diameter (7) of the cup spring (2), which is made as a closed ring contacts the piston (1) of the shifting element (3), a radially inner end of the cup spring (2) engages a sheet-metal sleeve (5) that is mounted to a housing (4) of the shifting element (3), and the sheet-metal sleeve (5) is mounted to the housing by one of a bayonet fixture and a bayonet mounting (6) such that the housing (4) has grooves and the sheet-metal sleeve (5) is made as a bayonet ring with a plurality of projections (9) that are insertable into the grooves provided in the housing and are lockable by rotation of the sheet metal sleeve with respect to the housing; and axially opposite ends of the sheet metal sleeve both extend radially outwardly, and both of the disk spring and the housing abut a radially outer side of the sheet-metal sleeve axially between the opposite ends of the sheet metal sleeve.

6. The arrangement of the cup spring in the piston of the shifting element, according to claim 5, wherein piston fingers (8), for actuating the shifting element (3), engage between and behind fingers of the cup spring (2).

* * * * *